United States Patent

Oda et al.

[11] Patent Number: 5,263,738
[45] Date of Patent: Nov. 23, 1993

[54] AIR BAG DEVICE FOR AN AUTOMOTIVE VEHICLE

[75] Inventors: Yoshio Oda, Kure; Isao Hirashima, Hiroshima; Haruhiro Inada, Hiroshima; Shigefumi Kohno, Hiroshima, all of Japan

[73] Assignee: Mazda Motor Corporation, Hiroshima, Japan

[21] Appl. No.: 859,020

[22] Filed: Mar. 30, 1992

[30] Foreign Application Priority Data

Mar. 29, 1991 [JP] Japan .................................. 3-091067

[51] Int. Cl.⁵ .............................................. B60R 21/16
[52] U.S. Cl. .................................. 280/728; 280/743; 280/732
[58] Field of Search ............... 280/728, 731, 732, 743, 280/728 A, 743 R

[56] References Cited

U.S. PATENT DOCUMENTS

| | | | |
|---|---|---|---|
| 4,482,300 | 6/1989 | Ziomek et al. | 280/732 |
| 4,830,401 | 5/1989 | Honda | 280/743 |
| 4,986,569 | 1/1991 | Bruton | 280/743 |
| 5,074,585 | 12/1991 | Satoh | 280/731 |
| 5,131,677 | 7/1992 | Horiuchi et al. | 280/731 |

FOREIGN PATENT DOCUMENTS 0234864  9/1990  Japan .................................. 280/728

*Primary Examiner*—Margaret A. Focarino
*Assistant Examiner*—Paul Dickson
*Attorney, Agent, or Firm*—Fish & Richardson

[57] ABSTRACT

An air bag device for an automotive vehicle which comprises a reaction can disposed in a dashboard of the vehicle and a ring frame attached inside a portion of the reaction can. The air bag device also includes an air bag having a distal portion, a fixed portion disposed between the reaction can and the ring frame and a protruding portion which extends outside of the reaction can. The protruding portion has a stiffness greater than he distal portion of the air bag, whereby the distal portion of the air bag is substantially prevented from being disposed between the reaction can and the ring frame. A method for attaching the air bag to the reaction can is also disclosed.

18 Claims, 4 Drawing Sheets

AIR BAG DEVICE FOR AN AUTOMOTIVE VEHICLE

BACKGROUND OF THE INVENTION

1. Field of the Invention

The present invention relates to an air bag device for an automotive vehicle. An air bag device is installed in a space inside an instrument panel or dashboard to protect an occupant of a passenger seat in a front passenger compartment during a collision of the automotive vehicle. The air bag is inflated from a folded state adjacent a reaction can during the collision.

2. Description of the Related Art

An air bag device including a reaction can is described for example in U.S. Pat. No. 4,842,300. This patent shows that the reaction can is closed by a cover during ordinary conditions. During a collision, the air bag is inflated due to a chemical reaction in the reaction can and the bag unfolds outwardly from the reaction can to open the cover and project into the passenger compartment.

There are two methods of installing an air bag into the reaction can. The first method is to fix the rim of the air bag to an opening of the reaction can and then to fold the air bag into the reaction can. The second method is accomplished by first folding the air bag and then installing the folded air bag into the reaction can. The second method is preferable because of the ease in assembly. In the second method, it is preferable to install the air bag into an inside of a ring frame to which the rim of the air bag is previously fixed for ease in assembly.

The prior art has a problem that when the air bag is assembled into the reaction can, a part of the folded air bag may get between the ring frame and the reaction can. In other words, a problem can occur during installation of the ring frame into the reaction can because a lapel or portion of the folded air bag is located near the fixing point between the ring frame and the reaction can. One solution to this problem is that careful assembly during installation of the air bag can sometime prevent this occurrence, however, this increases the complexity of the assembly and the installation time, thereby making it uneconomical.

SUMMARY OF THE INVENTION

It is an object of the present invention to provide an air bag structure for an automobile where assembly is easier and prevents the folded air bag from getting between the ring frame and the reaction can thereby maintaining the normal inflating function of the air bag.

The above mentioned object is achieved by providing an air bag device for automotive vehicle which comprises:

a reaction can disposed in a dashboard of the vehicle;

a ring frame attached inside a portion of the reaction can; and an air bag having a distal portion, a fixed portion disposed between the reaction can and the ring frame and a protruding portion which extends outside of the reaction can, the protruding portion having a stiffness greater than the distal portion of the air bag, whereby the distal portion of the air bag is substantially prevented from being disposed between the reaction can and the ring frame.

The present invention also can be achieved by an air bag device for an automotive vehicle, comprising:

a reaction can disposed in the vehicle;

a ring frame attached inside a portion of the reaction can;

an air bag comprising a distal portion and a fixed portion disposed between the ring frame and the reaction can, the fixed portion including a loop of material which is disposed around the ring frame so that a portion of the loop is disposed between the reaction can and the ring frame, and wherein the distal portion is attached to the fixed portion.

BRIEF DESCRIPTION OF THE DRAWINGS

The above objects and features of the present invention will be apparent to those skilled in the art from the following description of the preferred embodiments thereof when considered in conjunction with the appended drawings in which.

DETAILED DESCRIPTION OF THE PREFERRED EMBODIMENTS

Figure 1:
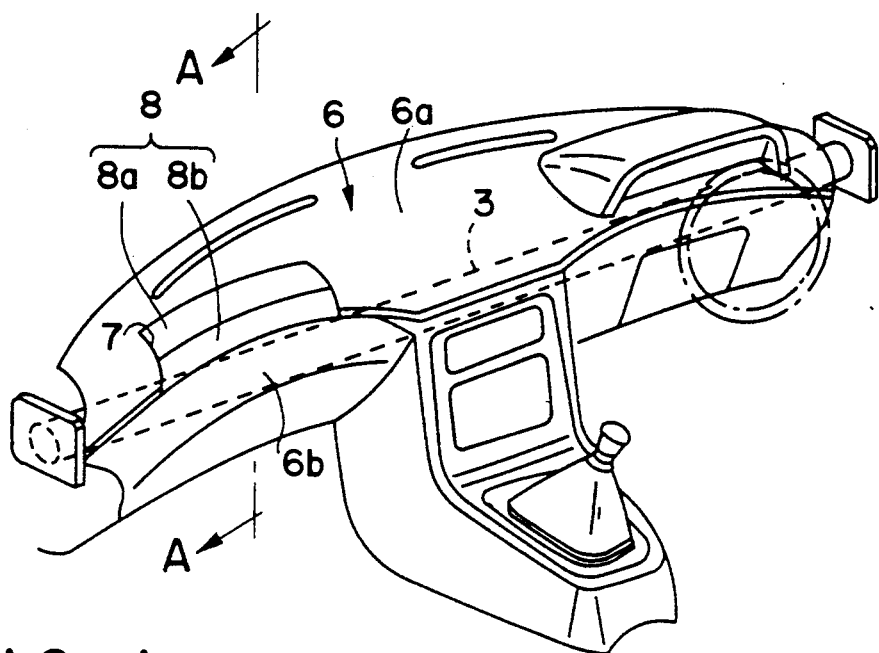
FIG. 1 is a perspective view of an interior portion of an automotive vehicle dashboard with an air bag device in accordance with an embodiment of the present invention.
Figure 2:
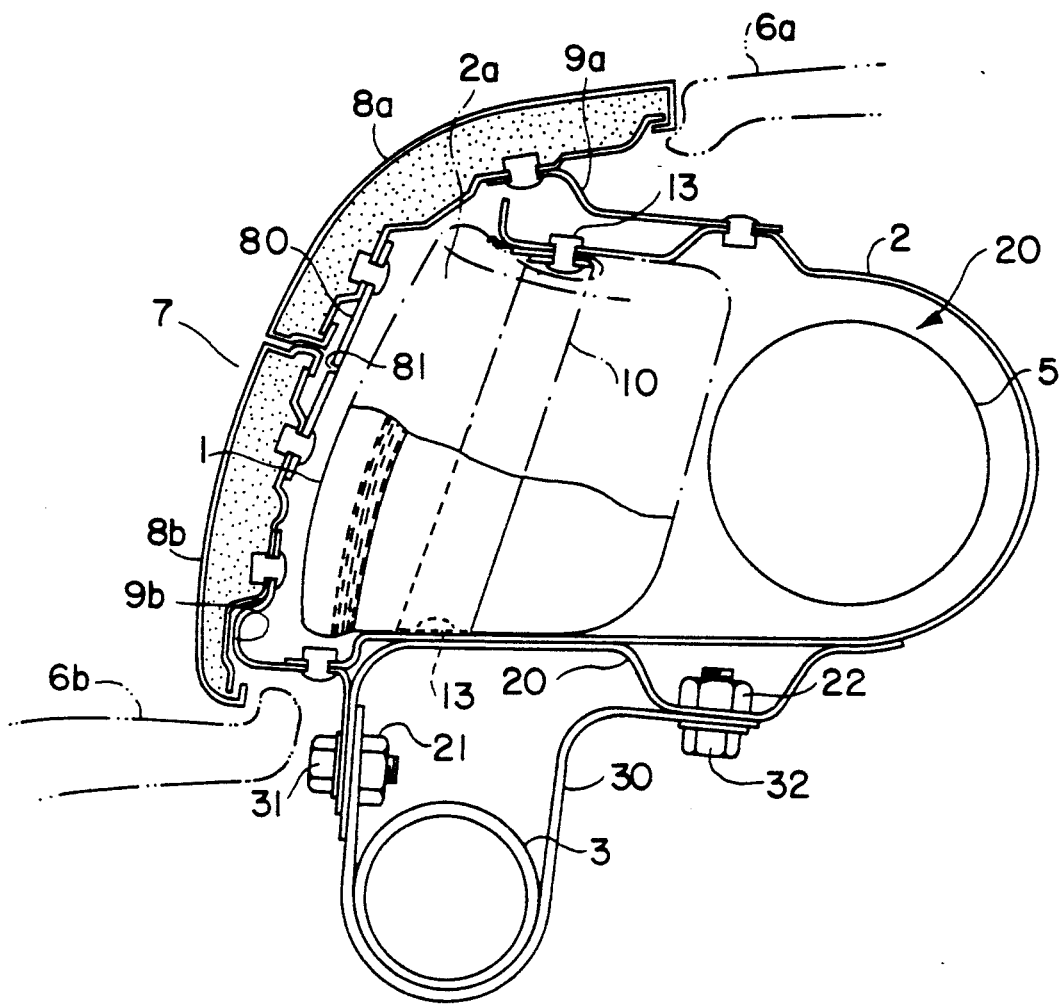
FIG. 2 is a cross sectional view of the instrument panel and air bag device as seen along line A—A of FIG. 1.

FIG. 1 illustrates a portion of an instrument panel structure or dashboard 6 of an automotive vehicle equipped with an air bag device in accordance with the preferred embodiment of the present invention. The vehicle is provided with a shelf 6b projecting into the passenger compartment at a lower portion of the instrument panel 6 in front of the passenger seat. The shelf is formed with a rectangular opening in an upper portion of the instrument panel structure 6. An air bag module 20, as seen in FIG. 2, is positioned inside a portion of the instrument panel 6. The air bag module is covered by means of a two-part air bag lid 8 mounted in the instrument panel opening 7, as will be described hereinafter.

As seen in FIGS. 1 and 2, the instrument panel opening 7 is formed in a curved portion of the instrument panel structure 6 directly above the shelf 6b and the air bag module 20 is positioned in the instrument panel opening 7, i.e., in a position towards the front of the vehicle.

The air bag module 20 is installed into a reaction can 2. The air bag projects through an opening 2a in the reaction can when it is inflated. In the reaction can 2, an inflater 5 is positioned which generates gas in response to a shock detecting means.

The reaction can 2 is supported by a steering support member 3 which extends transversely of the automotive vehicle. The opening of the reaction can 2a is positioned in front of the passenger's seat. Specifically, a bracket 20 secured to the reaction can 2 is attached to a bracket 30 which is secured to the steering support member 3 by bolts 31 and 32 and nuts 21 and 22.

The opening 2a of the reaction can 2 is formed to correspond to the rectangular opening 7 in part of the instrument panel 6 between the top deck portion 6a and the shelf 6b. The opening 7 is covered by an upper lid 8a and a lower lid 8b which are attached to the reaction can by plastic hinges 9a and 9b. The upper lid 8a and the lower lid 8b are connected to each other by connection plate 80 which includes a groove 81 that is formed to correspond to a contacting line between the upper lid 8a and lower lid 8b. When a collision occurs, the lids 8a and 8b are pushed out by the inflating air bag 1 and the groove 81 is broken.

Figure 3:
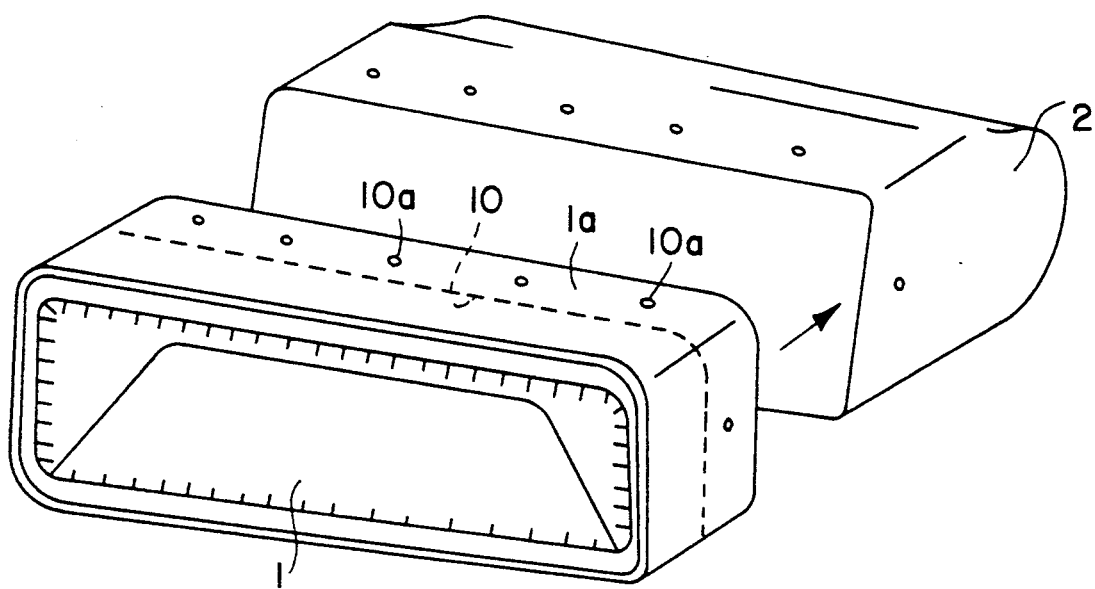
FIG. 3 is a perspective view of a folded air bag prior to insertion into the reaction can.

FIG. 3 illustrates a folded air bag 1 having a fixed portion 1a that is attached to a ring frame 10. The folded air bag 1 and the ring frame 10 are shown prior to insertion in and attachment to the reaction can 2. The air bag is folded into an inner portion of the ring frame 10. The ring frame 10 is then installed into the opening of the reaction can and attached by rivets 13 which pass into holes 10a in the ring frame.

FIGS. 4-8 show enlarged cross sectional views of the connection between the reaction can 2, ring frame 10 and air bag 1 according to various embodiments of the present invention.

Figure 4:
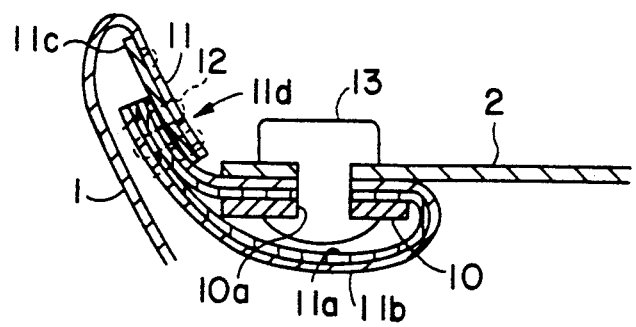
FIG. 4 is an enlarged cross sectional view of the connection between the reaction can, a ring frame and the air bag according to a first embodiment of the present invention.

FIG. 4 illustrates the attached condition of the air bag 1 according to a first embodiment. The rim of the air bag is attached to an attachment loop which is connected around the ring frame 10 and attached to the reaction can 2 by rivets 13. The present invention provides a protruding portion which protrudes from the reaction can so as to prevent a distal portion of the air bag from getting between the ring frame 10 and the reaction can 2. In this embodiment, a plurality of cloth members, which are made of the same type of cloth as the air bag 1, are piled up and attached to each other and project outwardly from the reaction can 2. A rim of the air bag is piled with two-folded pieces of cloth 11a and 11b as well as another piece of cloth 11c and is sewn by thread 12 in a region or portion 11d. The cloths 11a and 11b are formed in a loop and surround a portion of the ring frame 10. The sewn portion 11d is bent outwardly from the inside of the reaction can 2 and this portion 11d, which is made of a plurality of pieces of cloth 11a, 11b, and 11c, has a stiffness harder or stiffer than the remaining portion of the air bag 1. This stiffened portion 11d prevents the folded air bag 1 from getting between the ring frame 10 and the reaction can 2 during installation of the air bag 1. The pieces of cloth 11a, 11b and 11c which are connected with the air bag 1 and the ring frame 10 are inserted into the reaction can 2 and then attached to the reaction can by rivets 13 so as to install the air bag 1 to the reaction can 2. The protruding portion or sewn portion 11d keeps the remaining portion of the air bag, which is folded into the reaction can 2, away from the attached portion between the reaction can and ring frame so as to prevent the air bag from getting therebetween. This allows the air bag to inflate as normally expected and it makes assembly of the air bag easier because the installer does not have to concern himself with a portion of the air bag ending up between the frame and the reaction can.

Figure 5:
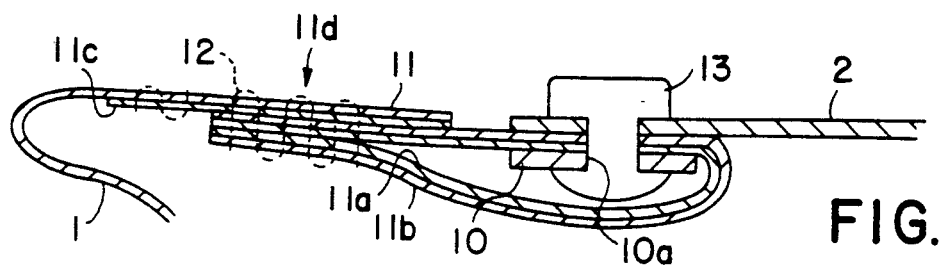
FIG. 5 is an enlarged cross sectional view of the connection between the reaction can, a ring frame and the air bag according to a second embodiment of the present invention.

FIG. 5 is an enlarged cross sectional view showing a second embodiment of the connection between the air bag and the reaction can 2. As in FIG. 4, the air bag is attached to a piece of cloth 11c which is also attached to a pair of cloth members 11a and 11b and sewn together by thread 12. In this embodiment, the sewn portion or the protruding portion 11d extends outwardly from the opening 2a in the reaction can 2.

Figure 6:
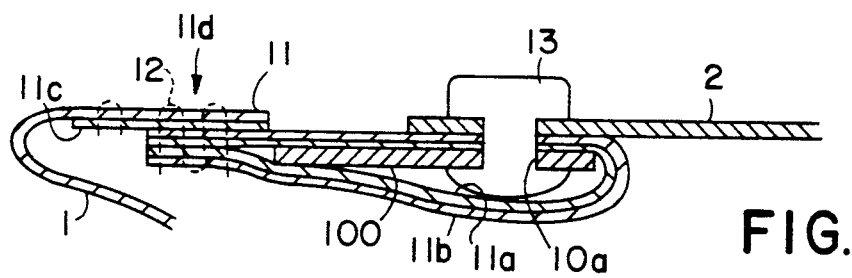
FIG. 6 is an enlarged cross sectional view of the connection between the reaction can, a ring frame and the air bag according to a third embodiment of the present invention.

FIG. 6 is an enlarged cross sectional view showing a third embodiment of the present invention which contains similar elements as described in FIGS. 4 and 5. According to the embodiment of FIG. 6, the ring frame 100 extends horizontally and outwardly from the opening in the reaction can 2. Once again, the hardened or stiffened projecting portion 11d prevents the folded air bag from getting in between the reaction can and the ring frame.

Figure 7:
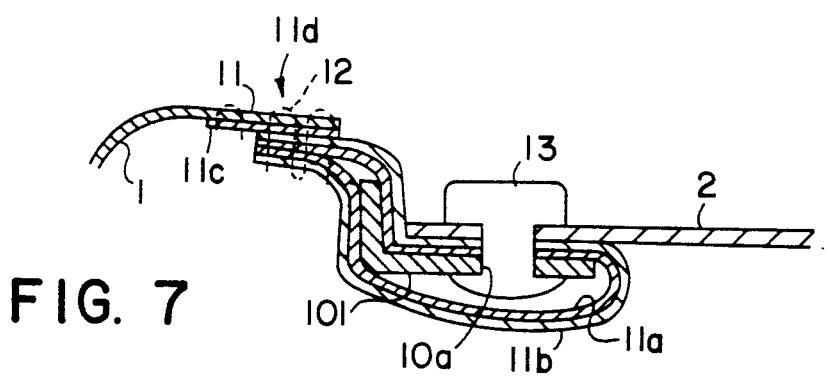
FIG. 7 is an enlarged cross sectional view of the connection between the reaction can, a ring frame and the air bag according to a fourth embodiment of the present invention.

FIG. 7 is an enlarged cross sectional view showing a fourth embodiment of the present invention. In this embodiment, the ring frame 101 extends past an edge of the reaction can and includes a portion which is disposed outwardly past the outer diameter of the reaction can 2. While this is shown as an L-shaped member, it is contemplated that this ring frame can have many other cross sectional shapes.

Figure 8:
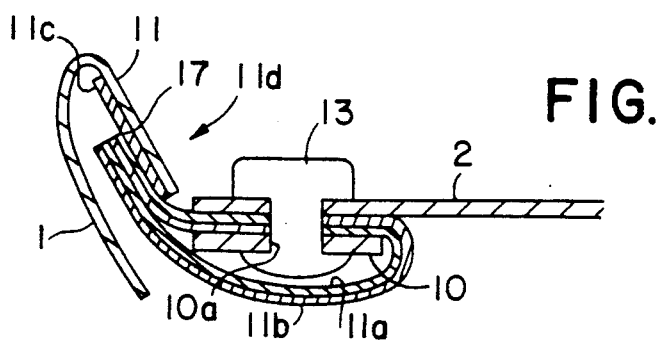
FIG. 8 is an enlarged cross sectional view of the connection between the reaction can, a ring frame and the air bag according to a fifth embodiment of the present invention.

FIG. 8 is a fifth embodiment of the present invention which shows that a rim of the air bag 1 can be attached to the cloth piece 11c by a hardening agent such as an adhesive. Likewise, the other pieces of cloth 11a and 11b can be attached to the cloth piece 11c and to each other by a hardening agent.

Figure 9:
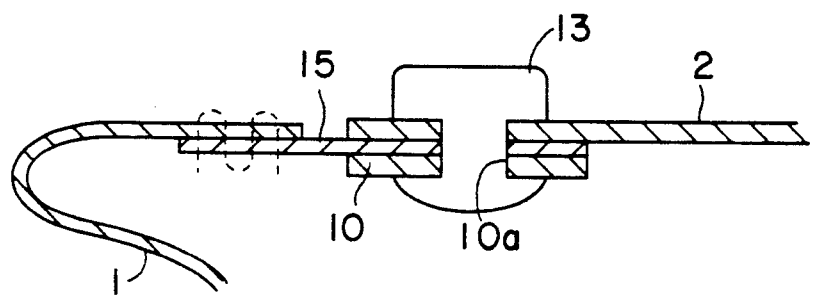
FIG. 9 is an enlarged cross sectional view of the connection between the reaction can, the ring frame and the air bag according to a sixth embodiment of the present invention.

FIG. 9 is a sixth embodiment of the present invention which shows a single piece of material 15 such as cloth which is similar to the air bag 1. The piece of material 15 is attached to a rim of the air bag 1 by thread similar to FIGS. 4-7.

The method of attaching the air bag device together will now be described in connection with the embodiments containing a loop of material 11a and 11b. Specifically, the method includes placing a loop of material around a ring frame, attaching a rim portion of the air bag to the loop of material, and attaching the ring frame and the loop of material to the reaction can. The rim portion can be attached by sewing or by applying an adhesive or laminating.

Various alternatives have also been contemplated for the present invention including using a single piece of material instead of the plurality of cloth pieces 11a, 11b and 11c in the embodiments shown in FIGS. 4-8. It is also contemplated that one can attach the ring frame 10 on the exterior of the reaction can 2 with the air bag disposed therebetween and achieve similar results.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. An air bag device for an automotive vehicle, comprising:
    a reaction can having an outer diameter, said reaction can being disposed in a dashboard of the vehicle, said reaction can having an opening on one side;
    a ring frame attached inside a peripheral portion of said reaction can near the opening; and
    an air bag folded into an inner portion of said air bag device so that said air bag is in a folded state, said air bag having a distal portion, a fixed portion connected to said ring frame and a protruding portion which extends outside an edge of the opening of said reaction can so that when in the folded state, a portion of said protruding portion is disposed radially outward from the outer diameter of said reaction can, said protruding portion having a stiffness greater than said distal portion of said air bag.

2. An air bag device as defined in claim 1, wherein said fixed portion includes a loop of material which is disposed around said ring frame.

3. An air bag device as defined in claim 1, wherein said fixed portion is a loop of material made of a plurality of pieces of cloth.

4. An air bag device as claimed in claim 1, wherein said protruding portion is sewn to a rim portion of said air bag.

5. An air bag device as claimed in claim 1, wherein said protruding portion is attached to a rim portion by an adhesive.

6. An air bag device as claimed in claim 1, wherein said ring frame includes a first portion which extends past the edge of said reaction can.

7. An air bag device as claimed in claim 6, wherein an edge of said first portion of said ring frame is disposed outwardly past the outer diameter of said reaction can.

8. An air bag device as claimed in claim 1, wherein said fixed portion is a first portion of a loop of material which is disposed around said ring frame and said protruding portion is a second portion of said loop disposed outwardly past the outer diameter of said reaction can.

9. An air bag device as claimed in claim 1, wherein said fixed portion is a portion of a loop of material which is disposed between said reaction can said ring frame.

10. An air bag device as claimed in claim 9, wherein said reaction can, said loop of material and said ring frame are attached together by at least one rivet.

11. An air bag device as claimed in claim 10, wherein said fixed portion includes an additional piece of material which is attached between said loop and a rim portion of said air bag.

12. An air bag device as claimed in claim 1, wherein said fixed portion is a separate piece of material attached to said air bag.

13. An air bag device as claimed in claim 1, wherein said fixed portion and said protruding portion are regions of a separate piece of material attached to a rim of said air bag.

14. An air bag device for an automotive vehicle, comprising:
    a reaction can disposed in a dashboard of the vehicle, the reaction can having an opening on one side;
    a ring frame attached inside a peripheral portion of said reaction can near the opening, said ring frame including a portion which extends outward past an edge of the opening; and
    an air bag folded into an inner portion of said air bag device so that said air bag is in a folded state, said air bag having a distal portion, a fixed portion connected to said ring frame and a protruding portion which extends outside the edge of the opening of said reaction can, and said protruding portion having a stiffness greater than said distal portion of said air bag.

15. An air bag device as claimed in claim 14, wherein when said air bag is in the folded state, a portion of said protruding portion is disposed radially outward from the outer diameter of said reaction can.

16. An air bag device as claimed in claim 14, wherein said reaction can includes an outer diameter and said portion of said ring frame extends radially outward beyond the outer diameter of said reaction can.

17. An air bag device for an automotive vehicle, comprising:
    a reaction can disposed in a dashboard of the vehicle, the reaction can having an opening on one side;
    a ring frame attached inside a peripheral portion of said reaction can near the opening; and
    an air bag folded into an inner portion of said air bag device so that said air bag is in a folded state, said air bag comprising a distal portion,
        a fixed portion comprising a loop of material connected to said ring frame; and
        a protruding portion disposed beyond an edge of the opening of said reaction can, said protruding portion having a stiffness greater than said distal portion of said air bag, and said protruding portion includes an additional piece of material which is attached between said loop and said distal portion of said air bag.

18. An air bag device as claimed in claim 17, wherein said additional piece of material is spaced from said reaction can and said ring frame.

* * * * *